March 13, 1934.                G. A. BIGGS                1,950,777
                          HYDRAULIC TURBINE
                       Filed Dec. 15, 1932        2 Sheets-Sheet 2
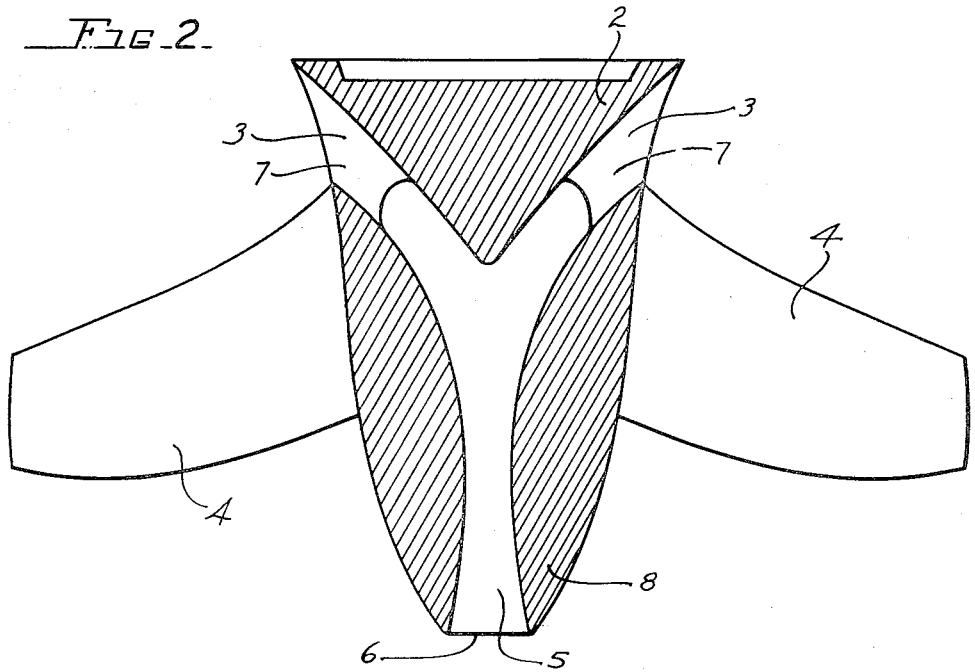
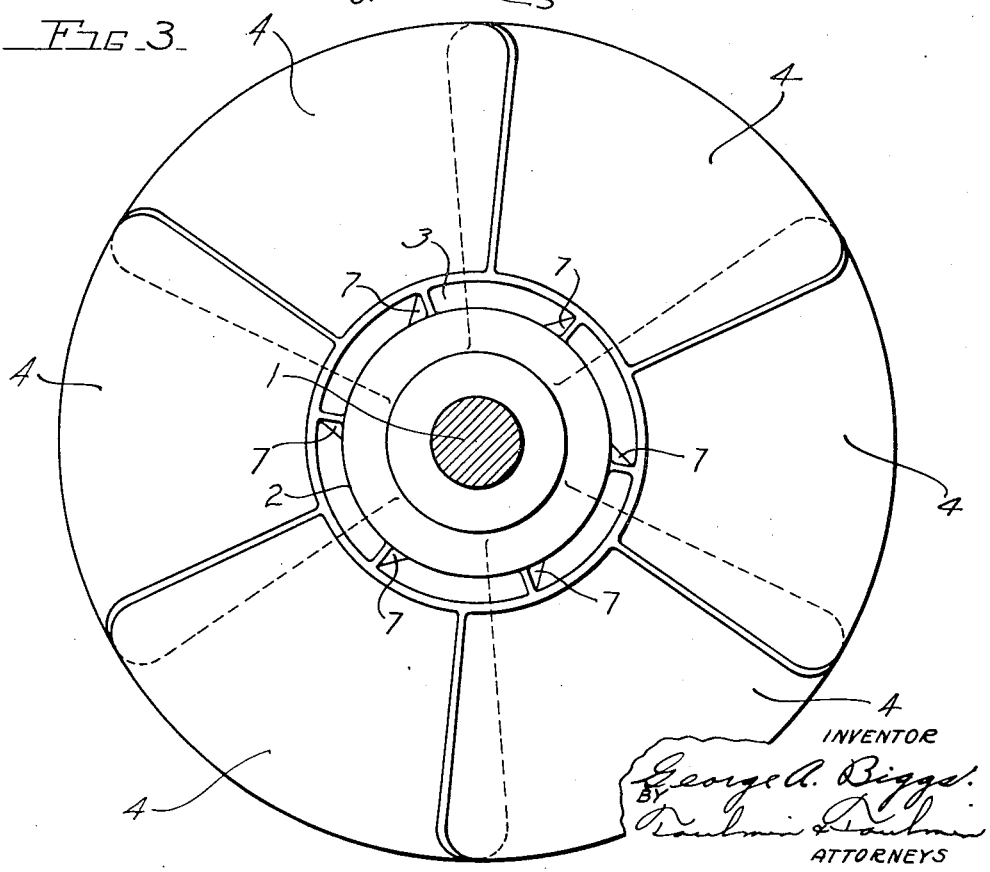

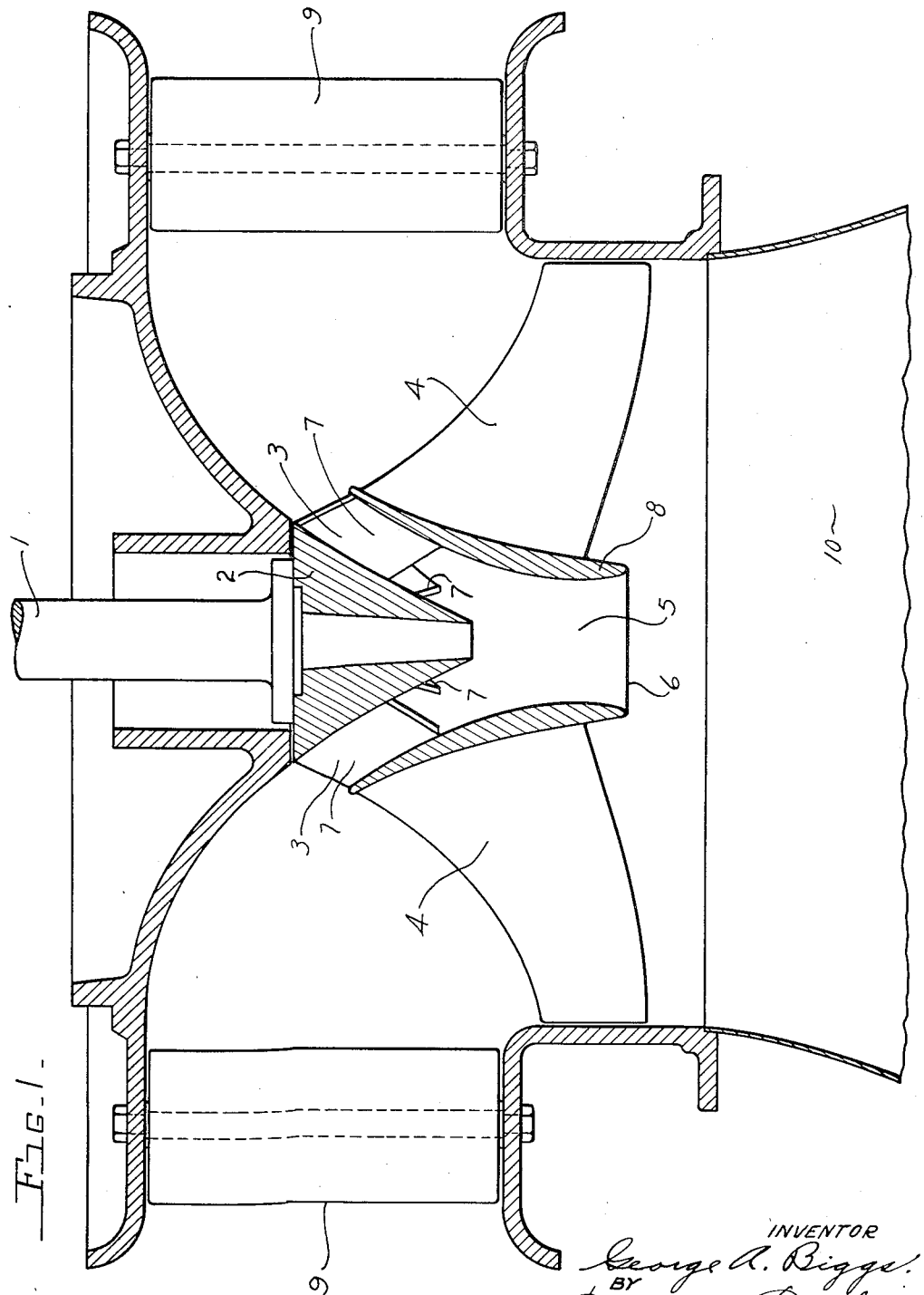

Patented Mar. 13, 1934

1,950,777

UNITED STATES PATENT OFFICE 1,950,777

HYDRAULIC TURBINE

George A. Biggs, Springfield, Ohio, assignor to The James Leffel & Company, Springfield, Ohio, a corporation of Ohio Application December 15, 1932, Serial No. 647,353

9 Claims. (Cl. 253—117)

My invention relates to hydraulic turbines.

It is the object of my invention to provide a hydraulic turbine runner in which a portion of the head waters is utilized to increase the speed of the waters that have passed over the buckets of the runner.

It is my object to carry a portion of the head waters through the runner without interfering with the blades of the runner but to provide an injector at the bottom of the hub of the runner to induce the flow over the runner buckets in order to increase the efficiency of the runner.

Referring to the drawings:

Figure 1 is a vertical section through the hydraulic turbine employing the runner of my invention;

Figure 2 is a section through a modified form of runner;

Figure 3 is a top plan view of the runner shown in Figure 1.

Referring to the drawings in detail, 1 is a runner shaft connected to a suitable generator. 2 is the hub of the runner through which there are a plurality of arcuate ports 3 entering the hub above the buckets 4 and discharging into a common exit passageway 5 below the buckets as at 6. This discharge is at high velocity due to the Venturi shape of the injector passageway thus described.

I also desire to utilize a plurality of guide vanes 7 which act as guide vanes for the water to direct it and also as means for attaching the hub shell 8 to the hub 2. It is on the hub shell 8 that the buckets 4 are mounted. 9 indicates the conventional gate mechanism and 10 the draft tube.

The object of my invention is to provide high velocity at the point of discharge below the buckets by diverting a portion of the head waters around the buckets.

The water passing over the buckets is reduced in its velocity by reason of the labor employed in working upon the buckets. The efficiency of the turbine depends in part upon the velocity with which the water below the runner is carried away from the runner.

It is my object to provide an injector of the character described for by-passing water passing directly through the runner and by reason of the fact of having passed through the runner itself there is imparted to the injecting water a whirling component which fits with the whirling component of the water which passes over the buckets.

In this way turbulence and eddies are prevented and the water constituting both bodies is mingled and caused to flow as a single unitary body thereby facilitating the evacuation of the water from the area immediately below the runner with resulting increased efficiency in the runner.

The high velocity exit 6 serves as a diffuser and makes a more even distribution of the water below the buckets. This result is facilitated by the rapid and easy flow of the water through the runner hub which result is facilitated by the vanes 7 which are also formed into the same section as the buckets or approximately similar sections thereby utilizing them both as buckets and as guide vanes.

It is my object to have this area through which the water is thus by-passed of relatively small size compared to the total area of the buckets 4 and correspondingly the vanes 7 are likewise of relatively small area.

It will be understood that I desire to comprehend within my invention such modifications as may be necessary to adapt it to varying conditions and uses.

Having thus fully described my invention, what I claim as new and desire to secure by Letters Patent, is:

1. In combination, a hydraulic turbine runner comprising a shaft, a cone-shaped hub having about it a hub shell forming an ejector passageway, a plurality of propeller buckets mounted on said shell, said injector passageway extending from a point above said buckets to a point below said buckets, the top of said hub being located approximately midway of the height of the entering water passageway and so arranged that the entering water will turn approximately 90 degrees before engaging the upper portion of the hub.

2. In combination, a hydraulic turbine runner comprising a shaft, a cone-shaped hub having about it a hub shell forming an injector passageway, a plurality of propeller buckets mounted on said shell, said injector passageway extending from a point above said buckets to a point below said buckets and comprising a plurality of openings leading from the top of the hub and converging into a single discharge passageway opening at the bottom of the hub shell, the top of said hub being located approximately midway of the height of the entering water passageway and so arranged that the entering water will turn approximately 90 degrees before engaging the upper portion of the hub.

3. In combination, a hydraulic turbine runner comprising a shaft, a cone-shaped hub having about it a hub shell forming an injector passageway, a plurality of propeller buckets mounted on said shell, said injector passageway extending from a point above said buckets to a point below said buckets and comprising a plurality of openings leading from the top of the hub and converging into a single discharge passageway opening at the bottom of the hub, and a plurality of vanes in said passageways, the top of said hub being located approximately midway of the height of the entering water passageway and so arranged that the entering water will turn approximately 90 degrees before engaging the upper portion of the hub.

4. In combination in a hydraulic turbine runner of a hub comprising an upper central cone-shaped hub section and an outer and lower shell, means interconnecting said hub section and shell to form a plurality of inwardly and downwardly converging passageways discharging from the bottom of the hub, and a plurality of propeller buckets mounted on the exterior of said shell, said buckets being above the bottom of the hub, the top of said hub being located approximately midway of the height of the entering water passageway and so arranged that the entering water will turn approximately 90 degrees before engaging the upper portion of the hub.

5. In a high speed hydraulic turbine runner, a shaft having thereon a cone-shaped hub, a spaced shell forming with the hub, a plurality of converging passageways entering at the top of the hub and discharging at the bottom thereof, vanes interconnecting said shell and hub, and a plurality of high speed runner buckets mounted on the exterior of said shell below the entrance to said passageways and above the discharge of said passageways, the top of said hub being located approximately midway of the height of the entering water passageway and so arranged that the entering water will turn approximately 90 degrees before engaging the upper portion of the hub.

6. In combination, a runner shaft having thereon a cone-shaped hub, a shell spaced from and depending below said hub, means for connecting the shell to the hub, and a plurality of downwardly and outwardly diverging propeller runner buckets of relatively greater length than the space between the hub and shell mounted upon the shell, the top of said hub being located approximately midway of the height of the entering water passageway and so arranged that the entering water will turn approximately 90 degrees before engaging the upper portion of the hub.

7. In combination, a hydraulic turbine runner, a runner shaft having thereon a cone-shaped hub, a shell mounted on the hub and spaced therefrom, the upper wall of the shell being arranged below the top of the hub and the bottom of the shell being arranged below the bottom of the hub, means to maintain a spaced relationship between the hub and shell, the space between the hub and the shell comprising relatively narrow diagonal passageways terminating in a relatively long narrow vertical passageway, and a plurality of propeller runner buckets mounted on said shell, the top of said hub being located approximately midway of the height of the entering water passageway and so arranged that the entering water will turn approximately 90 degrees before engaging the upper portion of the hub.

8. In combination, a hydraulic turbine runner, a runner shaft having thereon a cone-shaped hub, a shell mounted on the hub and spaced therefrom, the upper wall of the shell being arranged below the top of the hub and the bottom of the shell being arranged below the bottom of the hub, means to maintain a spaced relationship between the hub and shell, the space between the hub and the shell comprising relatively narrow diagonal passageways terminating in a relatively long narrow vertical passageway, and a plurality of propeller runner buckets mounted on said shell, the space below said diagonal passageways being arranged to converge inwardly and then outwardly to form a Venturi throat, the top of said hub being located approximately midway of the height of the entering water passageway and so arranged that the entering water will turn approximately 90 degrees before engaging the upper portion of the hub.

9. In combination, a hydraulic turbine runner, a runner shaft having thereon a cone-shaped hub, a shell mounted on the hub and spaced therefrom, the upper wall of the shell being arranged below the top of the hub and the bottom of the shell being arranged below the bottom of the hub, means to maintain a spaced relationship between the hub and shell, the space between the hub and the shell comprising relatively narrow diagonal passageways terminating in a relatively long narrow vertical passageway, and a plurality of propeller runner buckets mounted on said shell, the space below said diagonal passageways being arranged to converge inwardly and then outwardly to form a Venturi throat, and said means connecting the hub and shell being arranged to impart a whirling component to the water passing therebetween, the top of said hub being located approximately midway of the height of the entering water passageway and so arranged that the entering water will turn approximately 90 degrees before engaging the upper portion of the hub.

GEORGE A. BIGGS.